US008672681B2

(12) United States Patent
Markovitch (10) Patent No.: US 8,672,681 B2
(45) Date of Patent: Mar. 18, 2014

(54) SYSTEM AND METHOD FOR CONDITIONING A CHILD TO LEARN ANY LANGUAGE WITHOUT AN ACCENT

(76) Inventor: Gadi BenMark Markovitch, New York, NY (US)

( * ) Notice: Subject to any disclaimer, the term of this patent is extended or adjusted under 35 U.S.C. 154(b) by 341 days.

(21) Appl. No.: 12/915,504

(22) Filed: Oct. 29, 2010

(65) Prior Publication Data

US 2011/0104647 A1 May 5, 2011

Related U.S. Application Data

(60) Provisional application No. 61/256,206, filed on Oct. 29, 2009.

(51) Int. Cl.
*G09B 19/00* (2006.01)
(52) U.S. Cl.
USPC .......................................... 434/157; 434/156
(58) Field of Classification Search
USPC .......................................... 434/156, 157, 185
See application file for complete search history.

(56) References Cited

U.S. PATENT DOCUMENTS

| | | | |
|---|---|---|---|
| 3,828,446 A | 8/1974 | Mandel | |
| 4,177,578 A * | 12/1979 | Yamamoto | 434/157 |
| 4,609,357 A * | 9/1986 | Clegg | 434/167 |
| 5,164,900 A * | 11/1992 | Bernath | 715/264 |
| 5,307,442 A * | 4/1994 | Abe et al. | 704/270 |
| 5,697,789 A * | 12/1997 | Sameth et al. | 434/157 |
| 5,865,626 A * | 2/1999 | Beattie et al. | 434/185 |
| 5,893,720 A | 4/1999 | Cohen | |
| 5,906,492 A * | 5/1999 | Putterman | 434/169 |
| 5,953,692 A | 9/1999 | Siegel | |
| 5,964,593 A | 10/1999 | Cohen | |
| 5,995,932 A * | 11/1999 | Houde | 704/261 |
| 6,224,383 B1 * | 5/2001 | Shannon | 434/156 |
| 6,305,942 B1 * | 10/2001 | Block et al. | 434/156 |
| 6,341,958 B1 * | 1/2002 | Zilberman | 434/157 |
| 6,358,055 B1 | 3/2002 | Rothenberg | |
| 6,397,185 B1 | 5/2002 | Komissarchik et al. | |
| 6,604,947 B1 | 8/2003 | Rai | |
| 7,149,690 B2 * | 12/2006 | August et al. | 704/270 |

(Continued)

OTHER PUBLICATIONS

Speech Accent Archive <retreived from: http://webarchive.org/web/20070322230428/http://accent.gme.edu/ > <retreived at: Mar. 22, 2007>.*

(Continued)

*Primary Examiner* — Robert J Utama
(74) *Attorney, Agent, or Firm* — Peter A. Nieves; Sheehan Phinney Bass + Green PA (57) ABSTRACT

A system for conditioning a child to learn any language without an accent, contains a memory and a processor configured by the memory to perform the steps of: separating from a full International Phonetic Alphabet (IPA) set, a native language IPA, resulting in a derivative set, wherein the native language is at least one native language of the child; sequencing the derivative set according to aspects of the derivative set, wherein aspects are selected from the group including consonants, vowels, and tones, resulting in a sequenced derivative set; selecting words in foreign languages that use at least one aspect of the sequenced derivative set each; embedding the selected words in an easy to follow format, in the native language of the child; and playing the easy to follow format with the embedded words according to the prior determined sequence of the sequenced derivative set.

17 Claims, 5 Drawing Sheets

(56) References Cited

U.S. PATENT DOCUMENTS

| | | | |
|---|---|---|---|
| 7,502,731 B2* | 3/2009 | Emonts et al. | 704/9 |
| 7,590,533 B2* | 9/2009 | Hwang | 704/231 |
| 7,603,278 B2* | 10/2009 | Fukada et al. | 704/260 |
| 7,818,164 B2* | 10/2010 | Wood et al. | 704/5 |
| 8,271,281 B2* | 9/2012 | Jayadeva et al. | 704/250 |
| 2003/0040909 A1* | 2/2003 | Ghali | 704/235 |
| 2003/0143516 A1* | 7/2003 | Quiroz | 434/157 |
| 2005/0037322 A1 | 2/2005 | Kaul | |
| 2005/0048450 A1 | 3/2005 | Winkler | |
| 2006/0004567 A1* | 1/2006 | Russell | 704/209 |
| 2006/0019223 A1* | 1/2006 | Wood et al. | 434/156 |
| 2007/0009865 A1 | 1/2007 | Palacios | |
| 2007/0015121 A1* | 1/2007 | Johnson et al. | 434/156 |
| 2007/0055523 A1 | 3/2007 | Yang | |
| 2007/0168187 A1* | 7/2007 | Fletcher et al. | 704/209 |
| 2007/0212670 A1* | 9/2007 | Paech et al. | 434/185 |
| 2007/0255567 A1* | 11/2007 | Bangalore et al. | 704/260 |
| 2007/0255570 A1* | 11/2007 | Annaz et al. | 704/270 |
| 2007/0269775 A1* | 11/2007 | Andreev et al. | 434/156 |
| 2008/0153074 A1* | 6/2008 | Miziniak | 434/178 |
| 2009/0055162 A1* | 2/2009 | Qian et al. | 704/8 |
| 2009/0081622 A1* | 3/2009 | Goodman | 434/156 |
| 2009/0111075 A1 | 4/2009 | Midkiff | |
| 2009/0291419 A1* | 11/2009 | Uekawa et al. | 434/185 |
| 2011/0104647 A1* | 5/2011 | Markovitch | 434/185 |
| 2011/0111377 A1* | 5/2011 | Dekkers | 434/156 |
| 2012/0164611 A1* | 6/2012 | O | 434/167 |

OTHER PUBLICATIONS

Omniglot. <retreived from: http://web.archive.org/web/200703015085707/gttp://www.omniglot.com/writing/ipa.html><retreived at Mar. 15, 2007>.*

* cited by examiner

SYSTEM AND METHOD FOR CONDITIONING A CHILD TO LEARN ANY LANGUAGE WITHOUT AN ACCENT

CROSS-REFERENCE TO RELATED APPLICATIONS

This application claims priority to copending U.S. Provisional Application entitled, "SYSTEM AND METHOD FOR CONDITIONING A CHILD TO LEARN ANY LANGUAGE WITHOUT AN ACCENT," having Ser. No. 61/256,206, filed Oct. 29, 2009, which is entirely incorporated herein by reference.

BACKGROUND OF THE INVENTION

Tremendous resources are spent every year by individuals and companies to learn new languages. While an individual may be successful in learning a new language, it is quite often the case that the individual will have a strong accent. Typically, the accent is shaped by the native language of the individual. Having such an accent can be detrimental. As an example, strong accents can make understanding the spoken new language difficult. In addition, it is well known that having a strong accent can be a liability in the business world, especially in customer relations.

Figure 1:
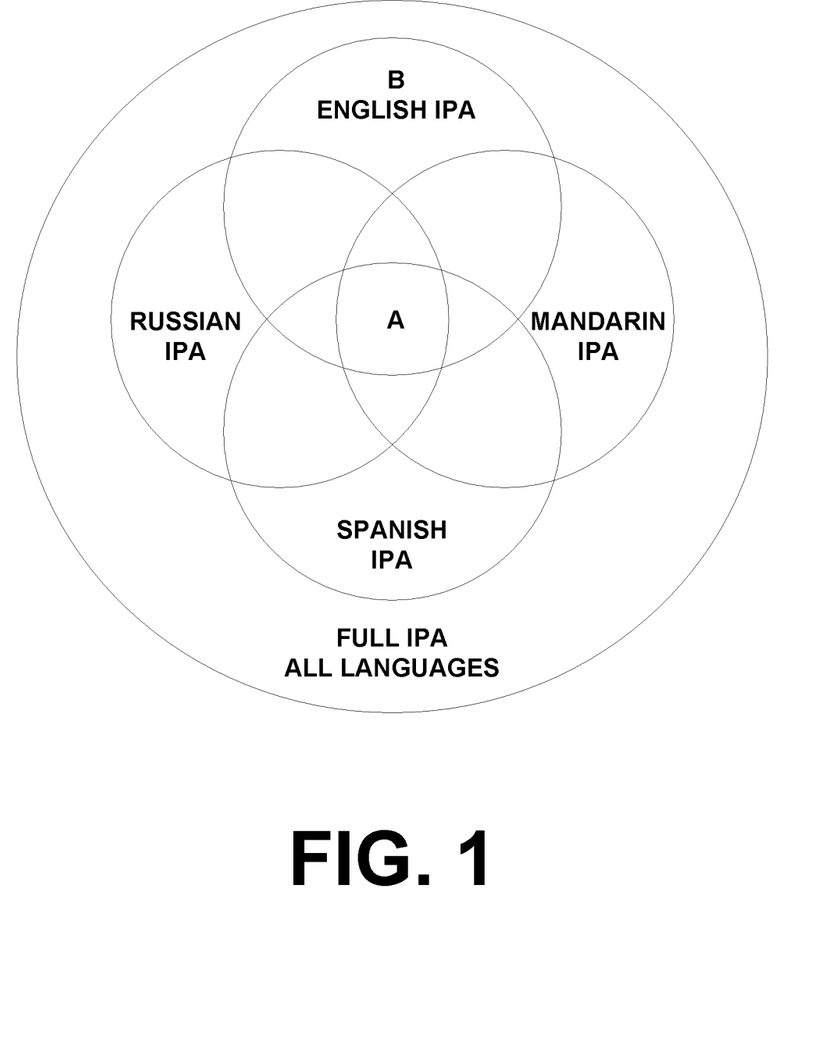
FIG. 1 is an International Phonetic Alphabet (IPA) diagram illustrating that there is an area of overlap between different languages and that there are sounds that exist in a certain language or languages but not in other languages.

The International Phonetic Alphabet (IPA) is a universal way to denote the sounds (utterances) of human languages. Each human language has its own IPA, which is a subset of the full IPA. As is illustrated by the diagram of FIG. 1, there is an area of overlap between languages (denoted as A), and then there are sounds that exist in a certain language or languages but not in other languages (denoted as B).

Human language sounds fall into one of four broad categories, namely, consonants, vowels, tones and stress, intonation and rhythm. When an adult who is a native speaker of language X, studies language Y, sounds of language Y that are not part of the IPA for language X are difficult for the adult to produce. This difficulty is often heard as the foreign accent to native speakers of language Y. In addition, in some cases such an adult would find it challenging to even recognize and distinguish some of the sounds in the language Y IPA that are not part of the language X IPA.

Thus, a heretofore unaddressed need exists in the industry to address the aforementioned deficiencies and inadequacies.

SUMMARY OF THE INVENTION

Embodiments of the present invention provide a system and method for conditioning a child to learn any language without an accent. The system for conditioning a child to learn any language without an accent, contains a memory and a processor configured by the memory to perform the steps of: separating from a full International Phonetic Alphabet (IPA) set, a native language IPA, resulting in a derivative set, wherein the native language is at least one native language of the child; sequencing the derivative set according to aspects of the derivative set, wherein aspects are selected from the group including consonants, vowels, and tones, resulting in a sequenced derivative set; selecting words in foreign languages that use at least one aspect of the sequenced derivative set each; embedding the selected words in an easy to follow format, in the native language of the child; and playing the easy to follow format with the embedded words according to the prior determined sequence of the sequenced derivative set.

The system may alternatively contain logic implemented via hardware logic circuitry configured to separate from a full International Phonetic Alphabet (IPA) set, a native language IPA, resulting in a derivative set, wherein the native language is at least one native language of the child; logic implemented via hardware logic circuitry configured to sequence the derivative set according to aspects of the derivative set, wherein aspects are selected from the group containing consonants, vowels, and tones, resulting in a sequenced derivative set; logic implemented via hardware logic circuitry configured to select words in foreign languages that use at least one aspect of the sequenced derivative set each; logic implemented via hardware logic circuitry configured to embed the selected words in an easy to follow format, in the native language of the child; and logic implemented via hardware logic circuitry configured to play the easy to follow format with the embedded words according to the prior determined sequence of the sequenced derivative set.

It should be noted that the system may be provided for a single user, such as via a single general computer, or may be provided within a server or other device that allows multiple users to interact with the system from remote locations. Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method is provided to condition a child to learn any language without an accent. A child who is a native speaker of language X, and learns to produce the sounds that are part of language Y IPA, but are not part of language X IPA, can then produce these sounds as an adult. The child, if he/she decides to study language Y as an adult, can easily produce the sounds of language Y IPA that are not in language X IPA, hence not sound as having a heavy foreign accent to native speakers of language Y.

The present invention is provided to teach children who are native speakers of language X, the sounds of the full IPA, minus those sounds that are contained by language X IPA, which they can already recognize, distinguish, and produce. The result is that these children will be able to recognize, distinguish, and then produce the full range of sounds of the IPA. At any point later in life, the children can study any language of their choosing, and be in a much better position to distinguish, recognize, and produce its IPA sounds that are not shared with their native language IPA.

For exemplary purposes, the IPA for the English language is presented as a specific example in table one below. In addition, the full IPA is presented in table two below.

Functionality of the present system 10 and method can be implemented in software, firmware, hardware, or a combination thereof. In a first exemplary embodiment, a portion of the system 10 is implemented in software 100, as an executable program, and is executed by a special or general-purpose digital computer, such as a personal computer, a portable or mobile computer, workstation, minicomputer, or mainframe computer. The first exemplary embodiment of a general-purpose computer architecture that can implement the system 10 is shown in FIG. 2.

Figure 2:
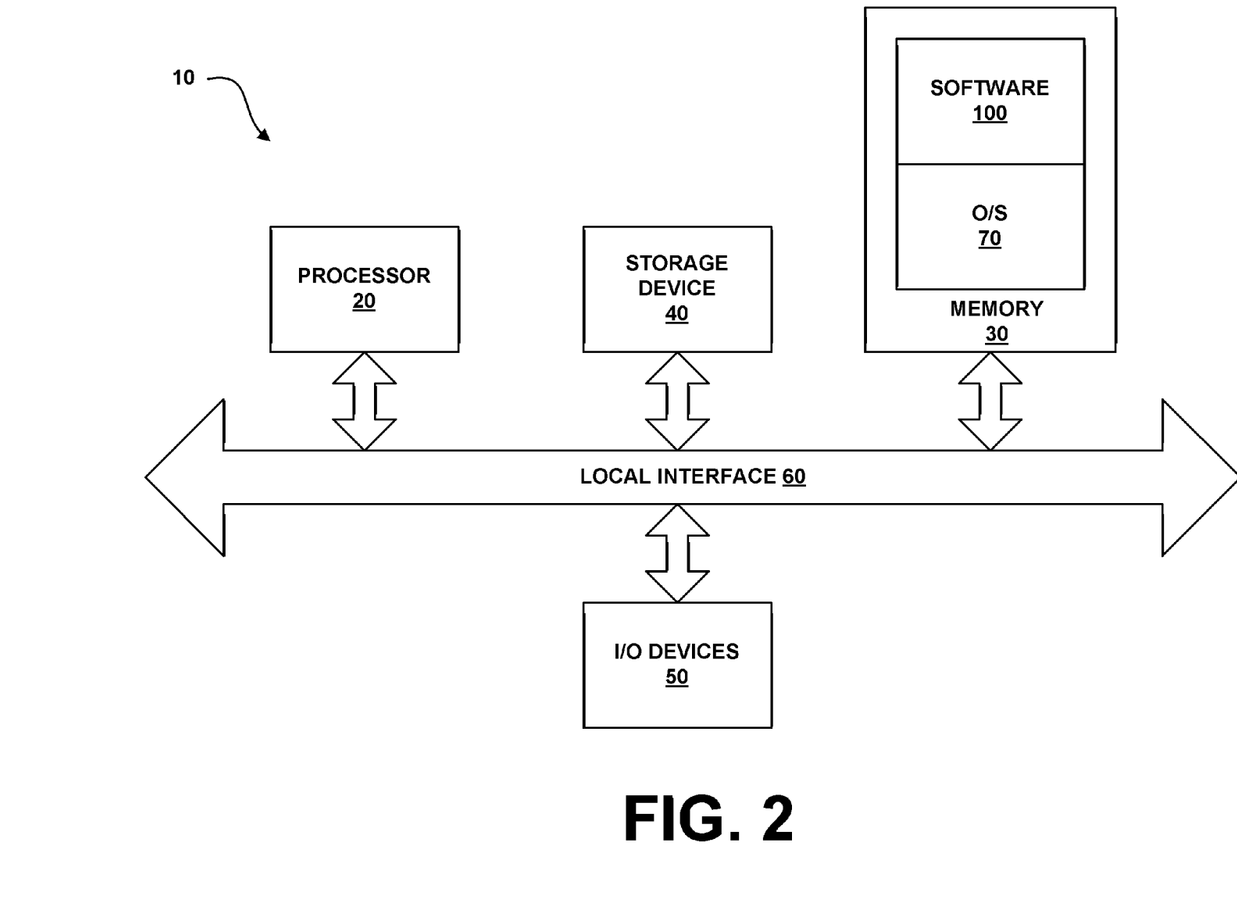
FIG. 2 is a schematic diagram illustrating a general-purpose computer architecture that can implement the present system.

Generally, in terms of hardware architecture, as shown in FIG. 2, the computer 10 includes a processor 20, memory 30, storage device 40, and one or more input and/or output (I/O) devices 50 (or peripherals) that are communicatively coupled via a local interface 60. The local interface 60 can be, for example but not limited to, one or more buses or other wired or wireless connections, as is known in the art. The local interface 60 may have additional elements, which are omitted for simplicity, such as controllers, buffers (caches), drivers, repeaters, and receivers, to enable communications. Further, the local interface 60 may include address, control, and/or data connections to enable appropriate communications among the aforementioned components.

The processor 20 is a hardware device for executing software, particularly that stored in the memory 30. The processor 20 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 30 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 30 may incorporate electronic, magnetic, optical, and/or other types of storage media. Note that the memory 30 can have a distributed architecture, where various components are situated remote from one another, but can be accessed by the processor 20.

The software 100 in the memory 30 may include one or more separate programs, each of which contains an ordered listing of executable instructions for implementing logical functions of the present system 10, as described below. In the example of FIG. 2, the software 100 in the memory 30 defines the system 10 functionality in accordance with the present invention. In addition, the memory 30 may contain an operating system (O/S) 70. The operating system 70 essentially controls the execution of computer programs and provides scheduling, input-output control, file and data management, memory management, and communication control and related services.

The system 10 may be provided by a source program, executable program (object code), script, or any other entity containing a set of instructions to be performed. When the system is provided by a source program, then the program needs to be translated via a compiler, assembler, interpreter, or the like, which may or may not be included within the memory 30, so as to operate properly in connection with the O/S 70. Furthermore, the system 10 can be written as (a) an object oriented programming language, which has classes of data and methods, or (b) a procedure programming language, which has routines, subroutines, and/or functions. In addition, the system 10 may be provided within a network so that multiple users may utilize the functionality of the software 100. Such a network may be a private network, the Internet, or a different network.

The I/O devices 50 may include input devices, for example but not limited to, a keyboard, mouse, scanner, microphone, joystick, handheld game console interface, or other input device. Furthermore, the I/O devices 50 may also include output devices, for example but not limited to, a printer, a speaker, display, or other output device. Finally, the I/O devices 50 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device. When the system 10 is in operation, the processor 20 is configured to execute the software 100 stored within the memory 30, to communicate data to and from the memory 30, and to generally control operations of the computer 10 pursuant to the software 100. The software 100 and the O/S 70, in whole or in part, but typically the latter, are read by the processor 20, perhaps buffered within the processor 20, and then executed.

When the system 10 is implemented in software, as is shown in FIG. 2, it should be noted that the system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 10 is implemented in hardware, the system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
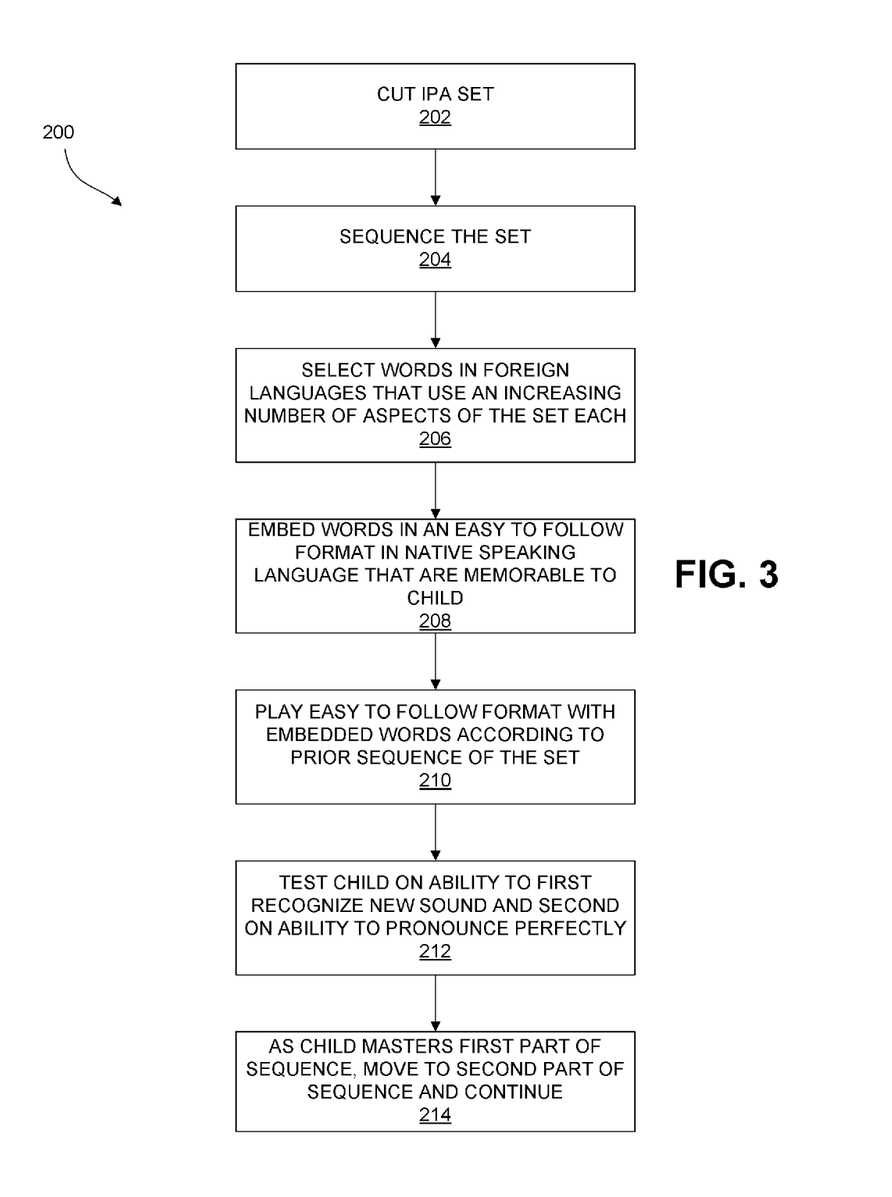
FIG. 3 is a flowchart illustrating a method of providing the abovementioned system in accordance with the first exemplary embodiment of the invention.

FIG. 3 is a flowchart 200 illustrating a method of providing the abovementioned system 10 in accordance with the first exemplary embodiment of the invention. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. It should be noted that each of the following functional blocks are described in further detail below.

Figure 4:
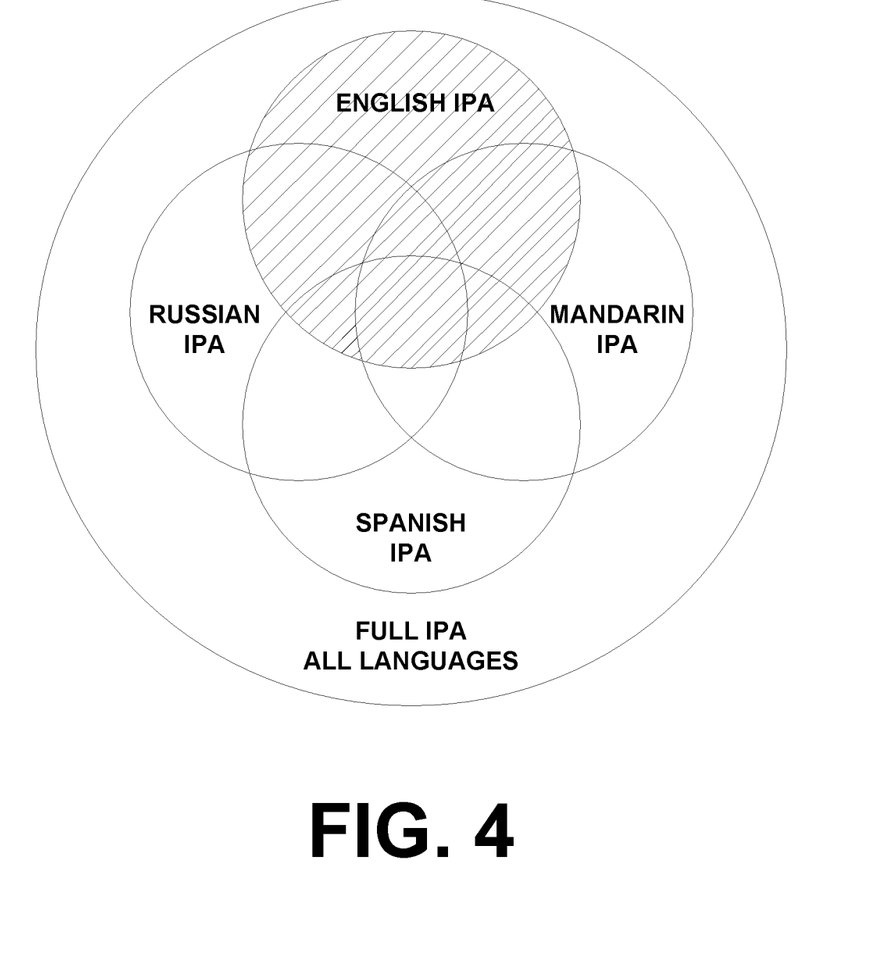
FIG. 4 is a diagram further illustrating removal of the IPA covered by a shaded English circle.

As is shown by block 202, the IPA set is cut so as to remove the native language IPA of the child from the comprehensive IPA circle. At this stage the native language IPA of the child is removed from the full IPA set. The diagram of FIG. 4 provides a further illustration of the removal, where one removes the IPA covered by the shaded English circle. For the present example, the native language of the child is English. What is left in the comprehensive IPA circle after the native language IPA of the child is removed, are the IPA sounds to be contained in the set. This resulting set is referred to herein as the native modified set. It should be noted that the native modified set is also referred to herein as a derivative set.

Returning to FIG. 3, the native modified set is then sequenced according to rules as described in further detail below (block 204), resulting in a sequenced set. It should be noted that while the following uses a specific grouping of the native modified IPA set, one having ordinary skill in the art would appreciate that a different logical sequence may be used. It is noted, however, that it is typically easier for a child to learn in the order listed below.

At this stage the native modified IPA set can be grouped into a few distinct categories, such as, for example, consonants, vowels, and tones, thereby providing the sequenced set. For exemplary purposes, these distinct categories can be sequenced so at to build an easy instruction set for the child. One such sequence can start with consonants (since consonants are easiest to learn), then vowels, then tones, though other sequences can also be selected, as long as the native modified IPA set is grouped into distinct categories, each containing one aspect (consonants, vowels, or tones).

Words in foreign languages that use an increasing number of aspects of the sequenced set each, are then selected (block 206). As an example, words in foreign languages may be picked that use one aspect of the sequenced set each, then two aspects of the sequenced set each, then three aspects of the sequenced set, according to the belowmentioned rules. It should be noted that consonants, vowels, and tones are each referred to herein as aspects.

Words that are picked are words that are easy to portray visually. The visual representation of the word should be distinct and memorable. An example of such a word may be, but is not limited to, a noun since nouns can easily be visualized. Words that are picked should be interesting to the child. As an example, for four year olds fascinated by animals, words should be animal names. Words are selected that each represent one aspect of the IPA sequenced set, namely, consonants, vowels, or tones. Although not required in accordance with the present invention, it is easiest to start with consonants (hereinafter referred to as "level 1 words"), then vowels ("level 2 words"), then tones ("level 3 words), as illustrated below, but such sequencing is not mandatory, as long as the full IPA set is covered with selected words that match the natural areas of interest of the child.

For example, dealing with consonants, for the IPA consonant [r], which does not exist in English, but exists in many other languages, pick the Spanish word "rata" which uses this sound, but other than that has no IPA that is not part of the English IPA (hence "rata" uses only one aspect of the sequenced set, the [r] aspect). As an example of dealing with vowels, for the IPS vowel [o], which does not exist in English, pick the French word "oiseau", which uses this sound, but has no other IPA that is not part of the English IPA (hence "oiseau" uses only one aspect of the sequenced set, the [o] aspect).

This exercise can be repeated for stress only if the native language of the child has an IPA that is unique in its use of stress. French, for example, is a language with no stressing at all, so it falls into this category, but English does not fall into this category because English uses multiple stress patterns, as evidenced by its IPA.

After having created groups of words where each group represents only one aspect of the sequenced set, words are selected that represent two aspects at a time, for example two consonants, or a consonant and a vowel, or a consonant and a tone that are not part of the English IPA. These words are labeled "level 4 words". Similarly, words are then selected that represent three aspects of the sequenced set each. These are labeled "level 5 words".

As shown by block 208, the selected words in the foreign languages are then embedded in an easy to follow format in the native speaking language, where the easy to follow format is memorable to the child. It should be noted that the format will depend on the age, experiences, and maturity of the child. As an example, the easy to follow format may be short stories, games, rhymes, quizzes, virtual adventures and experiences, or songs.

For each age group a selection of short stories, games, and songs in the native language of the child is used. These short stories, games, and songs are interesting to this age group, and are highly visual in nature. In "level 1 short stories" (or songs, or games, or rhymes, or virtual adventures and experiences, etc.) only "level 1 words" are embedded. In "level 2 short stories" (or songs, or games) only level 1 and level 2 words are embedded. In addition, in "level 3 short stories" (or songs, or games) only level 1, 2, and 3 words, and so on for levels 4 and 5 short stories.

The easy to follow format is then played with the embedded words (block 210), according to the sequence defined in block 204. For example, start with "level 1 short stories", which are stories in English, using foreign words introducing non English IPA consonants, one consonant at the time.

The child may then be tested on their ability to first recognize and distinguish the new sound, and second on their ability to pronounce the new sound perfectly (block 212). Since the words are all visual objects, tests should be focused on the ability of the child to memorize and recognize the sounds of the IPA set, and not on reading comprehension.

For example, in a story that uses "rata", assign "rata" to a very distinct kind of rat ("rata" is Spanish for rat, hence this is a "natural use") using a visual that would be memorable to the child. In a multiple choice question ask the child what animal this is, and play choices that are very close to "rata", yet are different than "rata" only in this new consonant aspect. When the child has memorized the new sound (in this case, the new consonant aspect), he/she will be able to pick the correct answer.

As shown by block 214, as the child masters the first part of the sequenced set, the present system 10 moves to the second part of the sequenced set and so on. At the end of the process, the child will have learned to recognize, distinguish, and produce the sounds of the IPA set that does not include their native language. These sounds could be associated with visuals in their minds, and will be at their disposal throughout life. When later in life this person decides to study Italian, as an example, when confronted with their first Italian word containing the vowel [o] (which is pretty much any Italian word that has the letter "o" in it), the person can be reminded of that exotic bird, the "oiseau". Even though "oiseau" is a French word, it contains the [o] sound, which the person now has completely at their disposal to recognize, distinguish, and pronounce correctly with no English accent.

Figure 5:
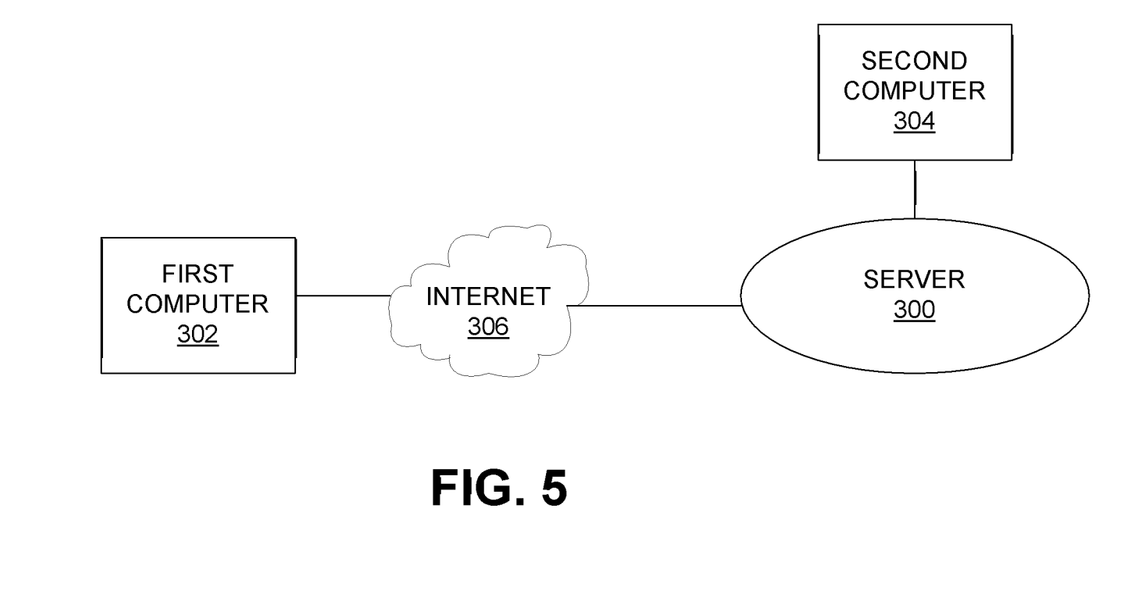
FIG. 5 is a schematic diagram illustrating use of the present system and method within a network, in accordance with the second exemplary embodiment of the invention.

As previously mentioned, not only can the system 10 be used for training a child at a single location, as shown by the first exemplary embodiment of the invention, but, in accordance with a second exemplary embodiment of the invention, the system 10 may also be provided within a network so that multiple users may utilize the functionality of the software 100. In such an embodiment, an example of which is illustrated by FIG. 5, the present system and method could be provided on a server 300, where multiple children may interact with the system by communication with the server 300 via individual computers, such as a first computer 302 and second computer 304 illustrated by FIG. 5. Communication with the server 300 may be provided by one or more of many different communication methods, such as, but not limited to, via the Internet 306, via wireless communication, via a wired connect, or via a local area network. In accordance with the second exemplary embodiment of the invention, the software is stored on the server 300 instead of individually on each computer 302, 304.

It should be noted that the abovementioned creating of a subset of the IPA, which excludes the native language of the child and leaves a set of sounds to be taught, does not need to include all of the remaining sounds of all human languages. As an example, if a parent would like their native English speaking child to learn only the sounds of French, Mandarin, and Spanish, and not prevent the child from having an accent for all other languages that he/she may learn outside of these three, instead of beginning with a full IPA, we would begin with a modified IPA having the sounds of English, French, Mandarin, and Spanish. The other abovementioned steps would proceed as previously mentioned.

TABLE 1

The Phonetic Alphabet for English

| IPA | Examples |
|---|---|
| Consonants | |
| b | buy, cab |
| d | die, cad |
| ð | thy, breathe, father |
| dʒ | giant, badge |
| f | phi, caff |
| g('g) | guy, cag |
| h | high, ahead |
| j | yes, hallelujah |
| k | kye, sky, crack |
| l | lie, sly, gal |
| m | my, smile, cam |
| n | nigh, snide, ban |
| ŋ | gang, sink, ringer |
| ŋg | finger |
| θ | thigh, math |
| p | pie, spy, cap |
| r | rye, try, very |
| s | sigh, mass |
| ʃ | shy, cash, emotion |
| t | tie, sty, cat |
| tʃ | China, catch |
| v | vie, have |
| w | wye, swine |
| hw | why |
| z | Zion, has |
| ʒ | pleasure, vision, beige |

| IPA | Traditional monophthongs | | R-colored vowels |
|---|---|---|---|
| | Vowels | | |
| æ | bat, bad, shall, ban | ær | barrow, marry |
| ɑː | balm, father, bra | ɑr | bar, mar, party, starring, (/ɑːr./) |
| ɒ | bot, pod, John, doll | ɒr | moral, forage |
| ɔː | bawd, caught, dawn, ball, straw | ɔr | born, for, aural (/ɔːr./) |
| oʊ | code, boat, goal, bone, go | oər | boar, four, more, oral (/oʊr./) |
| ʊ | good, foot, pull, Sunni | ʊər | boor, moor, tourist |
| uː | food, lute, pool, soon, blue | | (/uːr./) |
| ʌ | bud, but, dull, gun | ʌr | hurry, Murray |
| | | ɜr | bird, myrrh, furry (also /ɜː./) |
| ɛ | bed, pet, bell, men | ɛr | berry, merry |
| eɪ | fade, fate, fail, vein, pay | ɛər | bear, mare, Mary (/eɪr./) |
| ɪ | bid, pit, bill, bin | ɪr | mirror |
| iː | bead, peat, feel, mean, sea | ɪər | beer, mere, serious (/iːr./) |
| | Traditional diphthongs | | |
| aɪ | ride, write, file, fine, pie | ɔɪ | void, exploit, foil, coin boy |
| aʊ | out, loud, owl, down, how | juː | cute, hue, pew, dew |
| | Reduced vowels | | |
| ə | Rosa's, a mission | ən | button |
| i | happy, serious | əm | rhythm |
| i,ɨ | roses, emission | əl | bottle |
| ʉ | beautiful, curriculum ([jʉ]) | ər | perform, mercer (also /ɚ/) |
| ɵ | following, omission | | |

| Stress | | Syllabification | |
|---|---|---|---|
| IPA | Examples | IPA | Examples |
| ˈ | Intonation /ˌɪntəˈneɪʃən/, battleship /ˈbætəlʃɪp/ | . | shellfish /ˈʃɛl.fɪʃ/, selfish /ˈsɛlf.ɪʃ/ nitrate /ˈnaɪ.treɪt/, night-rate /ˈnaɪt.reɪt/ moai /ˈmoʊ.aɪ/ |

TABLE 2

The full International Phonetic Alphabet (IPA)
Main symbols
The symbols are arranged by similarity to letters of the Latin alphabet.
Symbols that do not resemble any letter are placed at the end.

| Symbol | Examples | Description |
|---|---|---|
| A | | |
| [a] | Spanish casa, French patte, German Mann | For many English speakers, the first part of the ow sound in cow. Found in some dialects of English in cat or father. |
| [a:] | German Aachen, French gare | Long [a]. |
| [ɐ] | RP cut, German Kaiserslautern | (With English, [ɐ] is normally written '[ʌ]'.) |
| [ɑ] | Finnish Linna, Dutch bad | |
| [ɑ:] | RP father, French pâte | Long [ɑ]. |
| [ɑ̃] | French Caen, sans, temps | Nasalized [ɑ]. |
| [ɒ] | RP cot | Like [ɑ], but with the lips slightly rounded. |
| [ʌ] | | Like [ɔ], but without the lips being rounded. (When '[ʌ]' is used for English, it may really be [ɐ] or [ɜ].) |
| [æ] | RP cat | |
| B | | |
| [b] | English babble | |
| [ɓ] | Swahili bwana | Like a [b] said with a gulp. |
| [B] | | Like the brrr sound made when cold. |
| [β] | Spanish la Bamba | Like [b], but with the lips not quite touching. |
| C | | |
| [c] | Turkish kebap "kebab", Czech stín "shadow" | Between English tune (RP) and cute. Sometimes used instead for [tʃ] in languages like Hindi. |
| [ç] | German Ich | More y-like than [x]. Some English speakers have a similar sound in huge. To produce this sound, try whispering loudly the word "ye" as in "Hear ye!". |
| [ɕ] | Mandarin Xi'an, Polish ściana | More y-like than [ʃ]; something like English she. |
| [ɔ] | see under O | |
| D | | |
| [d] | English did | |
| [ɗ] | Swahili Dodoma | Like [d] said with a gulp. |
| [ɖ] | American English harder | Like [d] with the tongue curled or pulled back. |
| [ð] | English the, bathe | |
| [dz] | English adze, Italian zero | |
| [dʒ] | English judge | |
| [dʑ] | Polish niedźwiedź "bear" | Like [dʒ], but with more of a y-sound. |
| [dʐ] | Polish dżem "jam" | Like [dʒ] with the tongue curled or pulled back. |
| E | | |
| [e] | Spanish fe; French clé | |
| [e:] | German Klee | Long [e]. Similar to English hey, before the y sets in. |
| [ə] | English above, Hindi ठग [ʈʰəg] "thug" "thief" | (Only occurs in English when not stressed.) |
| [ɚ] | American English runner | |
| [ɛ] | English bet | |
| [ɛ̃] | French Agen, vin, mairr; Polish ręka | Nasalized [ɛ]. |
| [ɜ] | RP bird (long) | |
| [ɝ] | American English bird | |
| F | | |
| [f] | English fun | |
| [ɟ] | see under J | |
| [ʃ] | see under J | |
| G | | |
| [g] | English gig | (Should look like g. No different from a Latin "g") |
| [ɠ] | Swahili Uganda | Like [g] said with a gulp. |
| [G] | | Like [g], but further back, in the throat. Found in some Arabic dialects for /q/, as in Gaddafi. |
| [ʒ] | see under Z | English beige. |
| H | | |
| [h] | American English house | |
| [ɦ] | English ahead, when said quickly. | |
| [ʰ] | | The extra puff of air in English top [tʰɒp] compared to stop [stɒp] or to French or Spanish [t]. |
| [ħ] | Arabic محمد Muhammad | Far down in the throat, like [h], but stronger. |
| [ɥ] | see under U | |
| [ɬ] | see under L | |
| I | | |
| [i] | French ville, Spanish Valladolid | |
| [i:] | English sea | Long [i]. |
| [ɪ] | English sit | |
| [ɨ] | Russian ты "you" | Often used for unstressed English roses. |
| J | | |
| [j] | English yes, German Junge | |
| [ʲ] | Russian Ленин [lʲeˈnʲin] | Indicates a sound is more y-like. |
| [ʝ] | Spanish cayo (some dialects) | Like [j], but stronger. |
| [ɟ] | Turkish gör "see", Czech díra "hole" | Between English dew (RP) and argue. Sometimes used instead for [dʒ] in languages like Hindi. |
| [ʄ] | Swahili jambo | Like [ɟ] said with a gulp. |
| K | | |
| [k] | English kick, skip | |
| L | | |
| [l] | English leaf | |
| [ɫ] | English wool Russian малый [ˈmɑɫɨj] "small" | "Dark" el. |
| [ɬ] | Welsh llwyd [ɬʊɪd] "grey" Zulu hlala [ɬaːla] "sit" | Rather like [l] and [ʃ] or [l] and [θ] said together. Found in Welsh names like Lloyd and Llywelyn and Nelson Mandela's Xhosa name Rolihlahla. |
| [ɭ] | | Like [l] with the tongue curled or pulled back. |
| [ɺ] | | A flapped [l], like [l] and [ɾ] said together. |
| [ɮ] | Zulu dla "eat" | Rather like [l] and [ʒ], or [l] and [ð], said together. |

TABLE 2-continued

The full International Phonetic Alphabet (IPA)
Main symbols
The symbols are arranged by similarity to letters of the Latin alphabet.
Symbols that do not resemble any letter are placed at the end.

| Symbol | Examples | Description |
|---|---|---|
| M | | |
| [m] | English mime | |
| [ɱ] | English symphony | Like [m], but lips touch teeth as they do in [f]. |
| [ɯ] | see under W | |
| [ʍ] | see under W | |
| N | | |
| [n] | English nun | |
| [ŋ] | English sing | |
| [ɲ] | Spanish Peña, French champagne | Rather like English canyon. |
| [ɳ] | Hindi वरुण [ʋəruɳ] "Varuna" | Like [n] with the tongue curled or pulled back. |
| [N] | Castilian Spanish Don Juan [doɴˈxwan] | Like [ŋ], but further back, in the throat. |
| O | | |
| [o] | Spanish no, French eau | |
| [o:] | German Boden, French Vosges | Long [o]. Somewhat reminiscent of English no. |
| [ɔ] | German Oldenburg, French Garonne | |
| [ɔ:] | RP law, French Limoges | Long [ɔ]. |
| [ɔ̃] | French Lyon, sorr, Polish kąt | Nasalized [ɔ]. |
| [ø] | French feu, bœufs | Like [e], but with the lips rounded like [o]. |
| [ø:] | German Goethe, French Deûle, neutre | Long [ø]. |
| [θ] | Swedish dum | Halfway between [o] and [ø]. Similar to [ʊ] but with the tongue slightly more down and front. |
| [œ] | French bœuf, seul, German Göttingen | Like [ɛ], but with the lips rounded like [ɔ]. |
| [œ:] | French œuvre, heure | Long [œ]. |
| [œ̃] | French brun, parfum | Nasalized [œ]. |
| [θ] | English thigh, bath | |
| [ɸ] | Japanese 富士 [ɸɯdʑi] Fuji | Like [p], but with the lips not quite touching |
| P | | |
| [p] | English pip, spit | |
| Q | | |
| [q] | Arabic Qurʾān | Like [k], but further back, in the throat. |
| R | | |
| [r] | Spanish perro, Scots borrow | "Rolled R". (Generally used for English [ɹ] when there's no need to be precise.) |
| [ɾ] | Spanish pero, Tagalog daliri, Malay kabar, American English kitty/kiddie | "Flapped R". |
| [R] | | A trill in the back of the throat. Found for /r/ in some conservative registers of French. |
| [ɽ] | Hindi साड़ी [sɑːɽiː] "sari" | Like flapped [ɾ] but with the tongue curled back. |
| [ɹ] | RP borrow | |
| [ɻ] | American English borrow, butter | Like [ɹ] but with the tongue curled or pulled back, as pronounced by many English speakers. |
| [ʁ] | French Paris, German Riemann | Said back in the throat, but not trilled. |
| S | | |
| [S] | English sass | |
| [ʃ] | English shoe | |
| [ʂ] | Mandarin Shàolín, Russian Пушкин (Pushkin) | Acoustically similar to [ʃ], but with the tongue curled or pulled back. |
| T | | |
| [t] | English tot, stop | |
| [ʈ] | Hindi ठग ठग [ʈʰəg] (thug) "thief" | Like [t], but with the tongue curled or pulled back. |
| [ts] | English cats, Russian царь tsar | |
| [tʃ] | English church | |
| [tɕ] | Mandarin 北京 Běijīng, Polish ciebie "you" | Like [tʃ], but with more of a y-sound. |
| [tʂ] | Mandarin zh, Polish cz | Like [tʃ] with the tongue curled or pulled back. |
| U | | |
| [u] | French vous "you" | |
| [u:] | French Rocquencourt, German Schumacher, close to RP food | Long [u]. |
| [ʊ] | English foot, German Bundesrepublik | |
| [ʉ] | Australian English food (long) | Like [ɨ], but with the lips rounded as for [u]. |
| [ɥ] | French lui | Like [j] and [w] said together. |
| [ɰ] | see under W | |
| V | | |
| [V] | English verve | |
| [ʋ] | Hindi वरुण [ʋəruɳə] "Varuna" | Between [v] and [w]. Used by some Germans and Russians for v/w, and by some speakers of British English for r. |
| [ɣ] | Arabic/Swahili ghali "expensive", Spanish suegro | Sounds rather like French [ʁ] or between [g] and [h]. |
| [ɤ] | Mandarin Hénán | Like [o] but without the lips rounded, something like a cross of [ʊ] and [ʌ]. |
| [ʌ] | see under A | |
| W | | |
| [W] | English wow | |
| [ʷ] | English rain [ɹʷeɪn] | Indicates a sound has lip rounding, quick. |
| [ʍ] | what (some dialects) | like [h] and [w] said together |
| [ɯ] | Turkish kaylk "caïque" | Like [u], but with the lips flat; something like [ʊ]. |
| [ɰ] | Spanish agua | |
| X | | |
| [X] | Scottish English loch, German Bach, Russian хороший [xɐˈroʂij] "good", Spanish joven | between [k] and [h] |
| [χ] | northern Standard Dutch Scheveningen, Castilian Spanish Don Juan [doɴˈxwan] | Like [x], but further back, in the throat. Some German and Arabic speakers have [χ] for [x]. |
| Y | | |
| [y] | French rue | Like [i], but with the lips rounded as for [u]. |
| [y:] | German Bülow, French sûr | Long [y]. |
| [Y] | German Eisenhüttenstadt | Like [I], but with the lips |

TABLE 2-continued

The full International Phonetic Alphabet (IPA)
Main symbols
The symbols are arranged by similarity to letters of the Latin alphabet.
Symbols that do not resemble any letter are placed at the end.

| Symbol | Examples | Description |
|---|---|---|
| [ʎ] | Spanish llama (Castilian) | rounded as for [ʊ]. More y-like than [l]. Rather like English volume. |
| [ʉ] | see under U | |
| [ʏ] | see under V | |
| [ɣ] | see under V | |
| Z | | |
| [z] | English zoos | |
| [ʒ] | English vision, French journal formal Russian жжёшь [ʒ:oʂ] "you burn", Polish źle | More y-like than [ʒ], something like beigey. |
| [ʐ] | Mandarin 人民日报 Rénmín Rìbào "People's Daily", Russian журнал "journal" | Like [ʒ] with the tongue curled or pulled back. |
| [ʓ] | see under L | |
| Other | | |
| [ʔ] | English uh-oh, Hawai'i, German die Angst | The 'glottal stop', a catch in the breath. For some people, found in button ['bʌʔn̩], or between vowels across words: Deus ex machina [ˌdeɪəsˌʔɛks'mɑːkinə]; in some nonstandard dialects, in a apple [ʌ'ʔæpl̩]. |
| [ʕ] | Arabic عربي ("arabī) "Arabic" | A light sound deep in the throat. |
| [ǀ] | English tsk-tsk! or tut-tut!, Zulu icici "earring" | (The English click used for disapproval.) Several distinct sounds, written as digraphs, including [kǀ], [gǀ], [ŋǀ]. The Zimbabwean MP Ncube has this click in his name, as did Cetshwayo. |
| [ǁ] | English tchick! tchick!, Zulu ixoxo "frog" | (The English click used to urge on a horse.) Several distinct sounds, written as digraphs, including [kǁ], [gǁ], [ŋǁ]. Found in the name of the Xhosa. |
| [ǃ] | Zulu iqaqa "polecat" | A hollow popping sound, like a cork pulled from a bottle. Several distinct sounds, written as digraphs, including [kǃ], [gǃ], [ŋǃ]. |

Diacritic Marks

All diacritics are here shown on a carrier letter such as the vowel a.

| Symbol | Example | Description |
|---|---|---|
| [ˈa] | pronunciation [pʰɹəˌnənsiˈeɪʃn̩] | Main stress. The mark denotes the stress of the following syllable. |
| [ˌa] | | Weaker stress. The mark denotes the stress of the following syllable. |
| [aː] | English shh! [ʃː] | Long. Often used with English vowels or diphthongs: Mayo /ˈmeːoː/ for [ˈmeɪʒʊ], etc. |
| [aˑ] | RP caught [ˈkʰɔˑt] | Semi-long. (Although the vowel is different, this is also longer than cot [ˈkʰɒt].) |
| [a̯] | English cow [kʰaʊ̯], koi [kʰɔɪ̯] | This vowel runs into the vowel next to it. (In English, the diacritic is generally left off: [kaʊ].) |

-continued

| Symbol | Example | Description |
|---|---|---|
| [ã] | French vin blanc [vɛ̃blɑ̃] "white wine" | A nasal vowel, as with a Texas twang. |
| [n̥] | | Sounds like a loud whisper; [n̥] is like a whispered breath through the nose. [l̥] is found in Tibetan Lhasa. |
| [n̩] | English button | A consonant without a vowel. (English [n̩] is often transcribed /ən/.) |
| [d̪] | Spanish dos, French deux | The tongue touches the teeth more than it does in English. |
| [kʰ] | English come | Aspirated consonant, pronounced with a puff of air. Similarly [tʰ pʰ tsʰ tʃʰ tɕʰ]. |
| [kʼ] | Zulu ukuza "come" | Like a popped [k], pushed from the throat. Similarly [tʼ pʼ qʼ tʃʼ tsʼ tɬʼ]. |
| [á] | Mandarin 妈妈 [māmā] "mother" | High tone. Careful! The Pinyin Romanization used for Mandarin has these same diacritics, but with different values. However, Thai Romanization uses them the way the IPA does. |
| [ā] | Mandarin 妈妈 [māmā] "mother" | Mid tone. |
| [à] | Mandarin 马的 [mǎdɤ] "horse's" | Low tone. |
| [â] | Mandarin 骂 [mâ] "scold" | Falling tone. |
| [ǎ] | Mandarin 麻 [mǎ] "hemp" | Rising tone. |
| [.] | English courtship [ˈkɔrt.ʃɪp] | Syllable break. (this is often redundant and therefore left off) |

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A system for conditioning a child to learn any language without an accent, comprising:
a memory; and
a processor configured by the memory to perform the steps of:
forming a derivative set of sounds from a full International Phonetic Alphabet (IPA) set by removing a native language IPA set from the full IPA set, wherein the native language is at least one native language of the child;
forming a sequenced derivative set of sounds by sequencing the derivative set according to aspects of the derivative set, wherein aspects are selected from the group consisting of consonants, vowels, and tones;
selecting words in foreign languages that use at least one aspect of the sequenced derivative set each;
embedding the selected words in an easy to follow format comprising a category according to one aspect, in the native language of the child; and
playing the easy to follow format with the embedded words according to the category of the sequenced derivative set.

2. The system of claim 1, wherein the step of sequencing the derivative set is further defined as grouping sounds into consonants from the derivative set, vowels from the derivative set, and tones from the derivative set.

3. The system of claim 1, wherein the step of selecting words in foreign languages is further defined as selecting words in foreign languages that use an increasing number of aspects of the sequenced derivative set each.

4. The system of claim 1, wherein the easy to follow format is selected from the group consisting of stories, games, and songs.

5. The system of claim 1, wherein the processor is further configured by the memory to perform the steps of:
   testing the child on their ability to first recognize new sounds and second to pronounce perfectly; and
   selecting words in the foreign languages that use an increasing number of aspects of the sequenced derivative set.

6. The system of claim 1, further comprising the step of visually representing a word of the selected words in foreign languages that use at least one aspect of the sequenced derivative set.

7. The system of claim 1, wherein the system is provided within a general computer.

8. The system of claim 1, wherein the system is provided within a server, thereby allowing more than one child to interact with the system.

9. A system for conditioning a child to learn any language without an accent, comprising:
   logic implemented via hardware logic circuitry configured to form a derivative set of sounds from a full International Phonetic Alphabet (IPA) set, by removing a native language IPA set from the full IPA set, wherein the native language is at least one native language of the child;
   logic implemented via hardware logic circuitry configured to form a sequenced derivative set of sounds by sequencing the derivative set according to aspects of the derivative set, wherein aspects are selected from the group consisting of consonants, vowels, and tones;
   logic implemented via hardware logic circuitry configured to select words in foreign languages that use at least one aspect of the sequenced derivative set each;
   logic implemented via hardware logic circuitry configured to embed the selected words in an easy to follow format comprising a category according to one aspect, in the native language of the child; and
   logic implemented via hardware logic circuitry configured to play the easy to follow format with the embedded words according to the category of the sequenced derivative set.

10. The system of claim 9, wherein the step of sequencing the derivative set is further defined as selecting consonants from the derivative set, vowels from the derivative set, and tones from the derivative set.

11. The system of claim 9, wherein the step of selecting words in foreign languages is further defined as selecting words in foreign languages that use an increasing number of aspects of the sequenced derivative set each.

12. The system of claim 9, wherein the easy to follow format is selected from the group consisting of stories, games, and songs.

13. The system of claim 9, wherein the system further comprises:
   logic implemented via hardware logic circuitry configured to test the child on their ability to first recognize new sounds and second to pronounce perfectly; and
   logic implemented via hardware logic circuitry configured to sequentially move to increasing parts of sequences as the child masters each sequence.

14. The system of claim 9, wherein the selected words in foreign languages that use at least one aspect of the sequenced derivative set each are words that are easy to portray visually.

15. The system of claim 9, wherein the system is provided within a general computer.

16. The system of claim 9, wherein the system is provided within a server, thereby allowing more than one child to interact with the system.

17. A system for conditioning a child to learn any language without an accent, comprising:
   a memory; and
   a processor configured by the memory to perform the steps of:
      forming a derivative set of sounds from a modified International Phonetic Alphabet (IPA) set, by removing a native language IPA set from the modified IPA set, wherein the native language is at least one native language of the child, and wherein the modified IPA contains sounds from languages that the child will learn in the future;
      forming a sequenced derivative set of sounds by sequencing the derivative set according to the aspects of the derivative set, wherein aspects are selected from the group consisting of consonants, vowels, and tones;
      selecting words in foreign languages that use at least one aspect of the sequenced derivative set each;
      embedding the selected words in an easy to follow format comprising a category according to an aspect, in the native language of the child; and
      playing the easy to follow format with the embedded words according to the category of the sequenced derivative set.

* * * * *